Dec. 21, 1965   H. W. GRIKSCHEIT ET AL   3,224,316
STRESS INDICATING MECHANICAL FASTENING DEVICE
Filed Sept. 6, 1963                                2 Sheets-Sheet 1
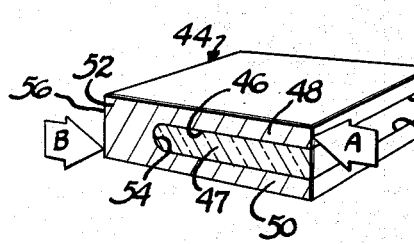
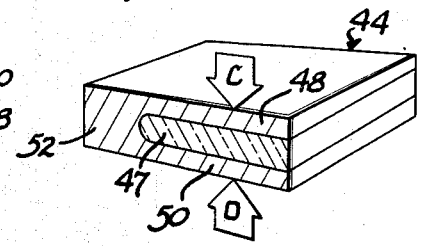
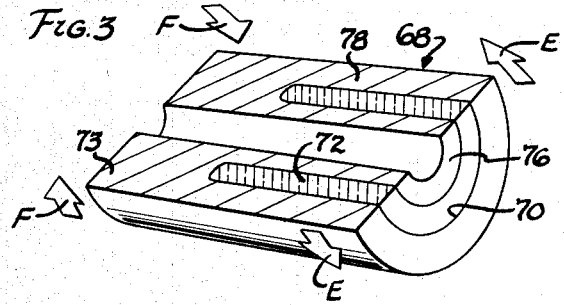
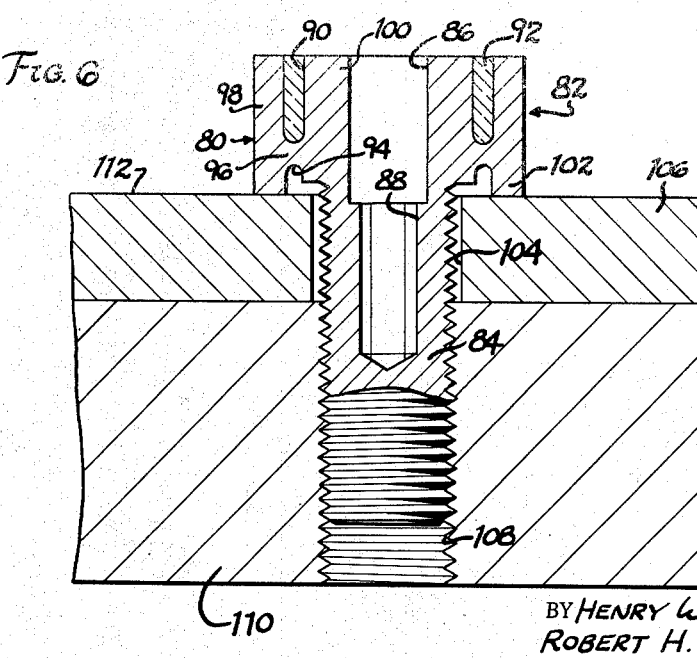
INVENTORS
BY HENRY W. GRIKSCHEIT
ROBERT H. SCHOTT
WILSON, SETTLE & CRAIG
ATTORNEYS Dec. 21, 1965  H. W. GRIKSCHEIT ET AL  3,224,316
STRESS INDICATING MECHANICAL FASTENING DEVICE
Filed Sept. 6, 1963  2 Sheets-Sheet 2

INVENTORS
HENRY W. GRIKSCHEIT
BY ROBERT H. SCHOTT
WILSON, SETTLE & CRAIG
ATTORNEYS

United States Patent Office 3,224,316
Patented Dec. 21, 1965

3,224,316
STRESS INDICATING MECHANICAL FASTENING DEVICE
Henry W. Grikscheit, Birmingham, and Robert H. Schott, Troy, Mich., assignors of one-fifth to The Detroit Testing Laboratory, Inc., Detroit, Mich., a corporation of Michigan
Filed Sept. 6, 1963, Ser. No. 307,242
3 Claims. (Cl. 85—62)

This invention relates to a stress indicating mechanical fastening device and more particularly to a mechanical fastening device which is capable of exactly indicating the specified stress, such as torque, which is being applied to the fastening device.

There are many instances in which fastening devices are used where it is desirable to know the stress to which the device is being subjected. The fastening device may be, for example, a nut, bolt, rivet, Allen head screw or the like. In critical applications, such as airplanes, missiles and the like, it is important that, for example, a nut be neither too tight nor too loose. Prior art techniques for indicating the torque applied to a nut have principally been directed to mechanisms on the wrench rather than mechanisms on the nut itself. Such indirect measurement, while adequate for many purposes, is not exact enough for many present day applications. The present invention provides an extremely accurate technique for indicating the stress applied to a fastening device, the technique including structure in the fastening device itself for the desired indication.

An object of the invention is to provide a stress indicating mechanical fastening device.

Another object of the invention is to provide such a fastening device which, in one embodiment, employs a material which will change color when a predetermined torque has been applied.

A further object of the invention is to provide a stress indicating fastening device having an outer ring member and an inner ring member, these ring members being connected by structure having a predetermined stress yield point at which relative movement will occur between the outer and inner ring members.

A still further object of the invention is to provide a stress-sensitive material between the ring members in intimate contact with the outer surface of the inner ring member and inner surface of the outer member to indicate the occurrence of such relative movement.

A yet further object of the invention is, in one embodiment, to provide a stress indicating nut having an outer wrench engageable polygonal surface, such surface having corner portions to permit engagement thereby with a wrench with the forces of the wrench being applied substantially tangentially of the nut surface to avoid the occurrence of any radial forces on the nut which would cause premature reaction of the stress-sensitive material and result in an inaccurate indication.

Other objects of this invention will appear in the following description and appended claims, reference being had to the accompanying drawings forming a part of this specification wherein like reference characters designate corresponding parts in the several views.

In the drawings:

FIGURE 1 is a diagrammatic view of one embodiment of the invention illustrating the application of shear to a stress indicating fastening device;

FIGURE 2 is a diagrammatic view similar to FIGURE 1 illustrating the application of a crushing force;

FIGURE 3 is a diagrammatic view similar to FIGURE 1 illustrating the application of torque;

FIGURE 6 is a sectional view of an Allen head screw in accordance with another embodiment of the present invention.

Figure 4:
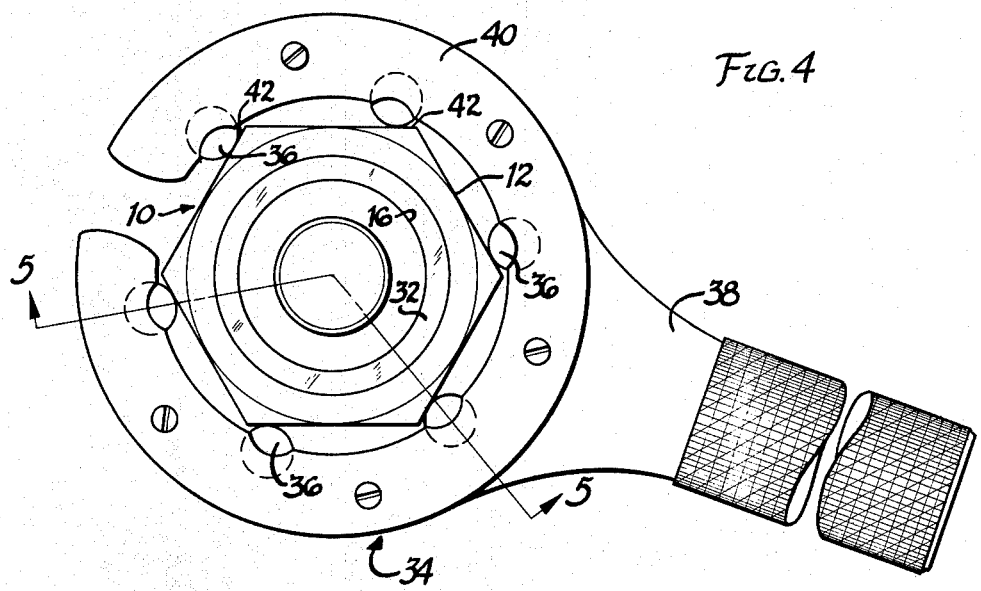
FIGURE 4 is a top plan view of a nut in accordance with one embodiment of the present invention with an illustrative special wrench in engagement with the outer wrench engageable surface thereof.

Before explaining the present invention in detail, it is to be understod that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The concept of the invention can be gained from an examination of FIGURE 1. As will be noted, a portion 44 of a fastening device (for example, the head of a bolt) is provided with a groove 46. The groove 46 may be in the form of a circle or it may be straight and extend entirely across the head of a square headed bolt. The groove 46 defines a pair of relatively movable walls 48, 50 which are connected together by the portion 52 which is left between the bottom 54 of the groove and surface 56. The portion 52 has a predetermined cross-sectional area.

The groove 46 is filled with a stress-sensitive material 47 which is adhesively or mechanically secured in place so as to be in intimate contact with the opposed surfaces 58, 60.

Several different types of stress-sensitive material may be utilized to fill the recess 46. A preferred stress-sensitive material is a frangible glass, such as a super-cooled glass which, upon relative movement of the walls 48, 50 will completely shatter. Such shattering results in a change in color and thus gives a visual indication that shattering has occurred. Such shattering will occur when the force applied to the fastening device has reached a predetermined value.

Other useful frangible materials are, for example, piezo electric material such as quartz, tourmaline, Rochelle salt, $K_2$ tartrate $\cdot \frac{1}{2} H_2O$, $Li_2SO_4H_2O$, $NH_4H_2PO_4$, $KH_2PO_4$, ethylene diamine tartrate, $BaTiO_3$ crystal and $BaTiO_3$ ceramic. These materials are crystalline materials and will shatter at a predetermined stress. Another advantage of piezo electric crystals is that instead of using them as a shatterable material, they may be used in terms of their electrical characteristics. In such an application, an electric signal which is proportional to the applied stress may be taken from the crystals and sent to a remote signalling device. Thus, in a critical application, warning could be given if a nut connection were becoming loose or were being tampered with.

Many different frangible materials other than those enumerated above may be utilized in connection with the invention. The primary characteristic of the materials are that they are of such a brittle or shatterable nature that they well evidence a distinct change in appearance when fractured.

In addition to frangible materials or materials which have altered electrical properties with a change in the applied stress, other materials which exhibit some definite change upon the application of stress may be used. For example, some crystalline materials undergo a change in refractive index under stress. This results in a color change which may be utilized as a signal.

Referring again to FIGURE 1, it will be noted that opposing forces, identified as arrows A and B, are shown applied to the device. Force A is applied to one end of the wall 48 while force B is applied to the opposite end of wall 50. These forces place the portion 52 in shear. When these forces are of sufficient magnitude, the portion 52 will yield, thus resulting in relative movement of the walls 48, 50 and causing the material 47 to react.

The basic concept of the invention is the provision of two relatively movable walls 48, 50 connected by a portion 52 of predetermined cross-sectional area. It is this portion which controls the point at which there will be perceptible relative movement of the walls. The device thus operates relatively independently of the type of material 47 which fills the groove 46. The point at which the walls will move can be varied by varying the cross-sectional area of the portion 52.

It will, of course, be appreciated that the groove 46 may have a configuration, such as terminating in a V-shape, so that the extent of the portion 52 cannot be determined geometrically. Additionally, it is also appreciated that there will be some slight relative movement of the walls 48, 50 even upon the application of minor forces thereon. However, there will not be appreciable relative movement until a relatively high force is applied.

When designing a fastening device in accordance with the invention, one should take into consideration the nature of the forces to be applied, the material of the fastening device and the nature of the stress-sensitive material.

For example, if the device placed in tension, is to be fabricated from steel (Young's Modulus of $28 \times 10^6$ lb./in.$^2$), is to have a stress-sensitive material which will fracture at $\frac{1}{100}$ of an inch of relative movement, where the length of the groove is 100 inches and the desired force to be applied is 1000 lb., the effective cross-sectional area of the portion 52 should be as follows:

$$A = \frac{Fl}{Me}$$

where

F = 1000 lbs.
M = $28 \times 10^6$ lbs./in.$^2$
E = $\frac{1}{100}$ in.
L = 100 in.

$$A = \frac{1000 \text{ lbs.} \times 100 \text{ in.}}{28 \times 10^6 \text{ lbs./in.}^2 \times \frac{1}{100} \text{ in}}$$

$$A = \frac{10}{28} \text{ in.}^2$$

FIGURE 2 illustrates the application of opposed forces C and D to the wall surfaces 64, 66 of the portion 44. The forces place a bending force on the connecting portion 52 with a resulting relative movement of walls 48, 50 which tends to crush the material 47.

FIGURE 3 illustrates a cylindrical member 68 (such as would be the case with a nut or the head of a bolt) which is subjected to torque. An annular groove 70 is provided and is filled with stress-senitive material 72. A torque E is applied to the outer surface and is resisted by a torque F (the frictional resistance of the usrface againts which the nut abuts). The portion 73 which connects inner and outer rings 76 and 78 is thus subjected to torque which, at the appropriate point, will result in relative movement of rings 76, 78 to affect the material 72.

Figure 5:
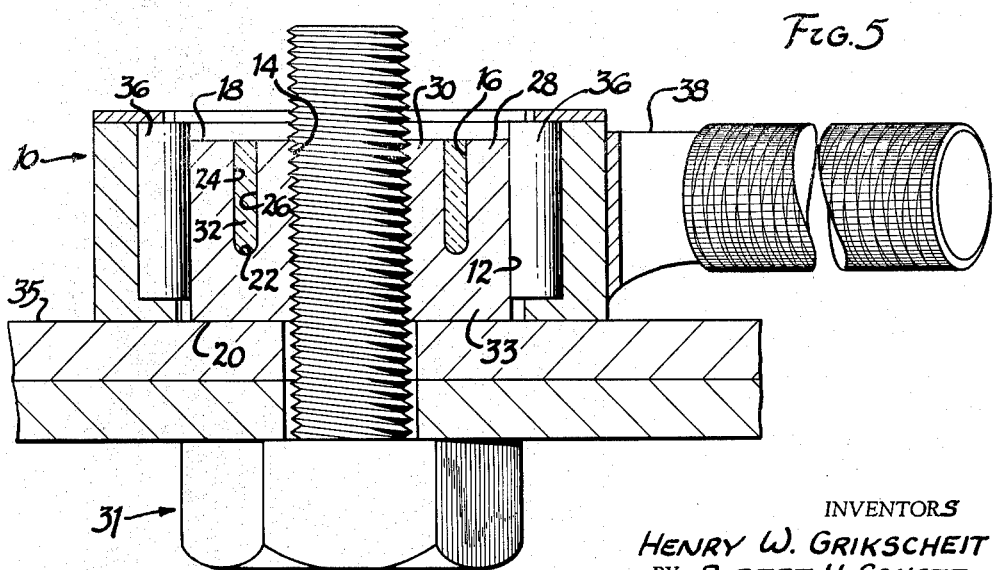
FIGURE 5 is a sectional view taken substantially along the line 5—5 of FIGURE 4 looking in the direction of the arrows.

Referring to FIGURES 4 and 5, it will be seen that a specific embodiment of a torque indicating nut 10 is shown. The nut 10 comprises a relatively conventionally shaped hexagonal nut body with a wrench engageable surface 12 and an internally threaded opening 14.

An annular groove or recess 16 is provided in one end 18 of the nut. This groove 16 is concentric with the outer surface 12 and the inner surface 14. The shape and size of the groove 16 may vary in accordance with the invention to provide different torque sensitivities.

The groove 16 extends to a depth short of the opposite end surface 20 of the nut. This leaves a preselected amount of the nut body material between the bottom 22 of the groove and the bottom surface 20 of the nut. The groove 16 is filled with a stress-sensitive material 32 which is secured in place in intimate contact with the opposed surfaces 24, 26.

The basic concept of the invention may be more clearly understood by reference to FIGURE 5. As will be appreciated in FIGURE 5, the outer portion 28 of the nut forms, in essence, an outer ring member. The inner portion 30 forms an inner ring member. The ring members 28, 30 are connected by the material 33 which remains beneath the recess in the nut. The material 33 will yield at a predetermined stress. When this material yields, relative rotative movement will occur between the outer ring member 28 and the inner ring member 30. Such relative movement will cause fracturing of the frangible material provided in the recess.

The stress yield point of the material 32 may be varied as desired by altering the configuration of the recess.

In operation, a wrench 34 is applied to the outer surface of the ring member 28. The torque thus exerted is transmitted through the connecting material 33 to the inner ring member 30. The ring member 30, which is received on a bolt 31, will then be turned and threaded onto the bolt. When the lower surface of the nut engages the surface 35 from which the bolt extends, considerable torque will be exerted on the nut in opposition to the torque applied to the ring member 28 to thread the nut onto the bolt. This reverse torque will tend to prevent further threading of the nut. However, it is desired to tighten the nut until a specific predetermined torque is reached. This torque may be predetermined by selection of a cross-sectional area of the material 33 which will yield at the desired torque permitting relative motion between the outer ring 28 and inner ring 30.

The turning force applied to the outer surface of the nut should be applied tangentially so as to avoid the application of radial crushing forces. Pure torque may be obtained, for example, by the use of a spanner wrench such as is used to adjust the valves of an internal combustion engine. A wrench 34 for applying tangential forces is illustrated in FIGURES 1 and 2. A complete disclosure of this wrench is given in Patent No. 2,550,-010, Kavalar, April 24, 1951. The wrench 34 comprises a handle 38 having an arcuate end portion 40. Mounted within the end portion 40 are a plurality of spring urged rollers 36. The rollers are located, with respect to the outer surface of the nut 10, so that they will engage the corner surfaces 42 of the nut when the wrench is turned. This single line engagement is substantially tangential about the central axis of the nut. Thus, the application of radial forces is avoided and the frangible material in the recess 16 will not be disturbed until there is relative movement between the outer and inner portions of the nut.

It will be understood that the same basic configuration and results will be obtained if the stress indicating features of the nut 10 are applied to the head of a bolt.

Another specific embodiment of the invention is illustrated in FIGURE 6. A screw 80 is provided with a head 82 from which extends an externally threaded shank 84. The head 82 has an opening 86 which extends to an Allen socket 88 provided in the shank 84. It will be noted that the socket 88 is beneath the head 82 so that the torque of an Allen wrench will not be directly applied to the head 82.

The head 82 has an annular groove 90 which is filled with a stress-sensitive material 92. An annular recess 94 is provided in the opposite end of the head 82. The recess 94 is in registry with the groove 90 to thus define a portion 96 which connects the inner and outer ring portions 98, 100 of the head, A circumferential flange 102 extends axially outwardly from the lower end of the head 82.

In operation, the screw 80 extends through an opening 104 of one member 106 into threaded engagement with threaded opening 108 of a second member 110 to thus connect these members together.

When the flange 102 contacts the surface 112, a force tending to shear the portion 96 will be applied to the head 82. When this force reaches a specified value, sufficient relative movement will occur between the rings 98, 100 to cause a change in the material 92 to thus apprise the operator that the screw 80 has been sufficiently tightened.

Having thus described our invention, we claim:

1. A torque indicating fastening device comprising a body having an internally threaded opening for securement to other structure, said body having an upper end surface and a lower end surface, said body having an annular recess concentric with the internally threaded opening, said recess extending from the upper end surface towards the lower end surface and defining an outer wall portion and an inner wall portion, the body material between the bottom of the recess and the lower end surface having a predetermined cross-sectional area to result in a predetermined stress yield point, and a stress-sensitive material in the recess in intimate contact with the surfaces defining the recess, said stress-sensitive material being reactive to relative movement of the aforementioned outer wall portion and inner wall portion of the body to indicate the occurrence of such relative movement, relative movement occurring when the torque applied to the body reaches the stress yield point of the body material between the bottom of the recess and said lower end surface.

2. A torque indicating fastening device comprising a body having means thereon for securement to other structure, said body having an upper end surface and a lower end surface, said body having an annular recess extending from the upper end surface towards the lower end surface, the body material between the bottom of the recess and the lower end surface of the body having a predetermined cross-sectional area to result in a predetermined stress yield point, and a stress-sensitive frangible material in the recess in intimate contact with the surfaces defining the recess, said stress-sensitive material being reactive to the relative movement of the adjacent portions of the body to fracture and visually indicate the occurrence of such relative movement, relative movement occurring when the torque applied to the body reaches the stress yield point of the body material between the bottom of the recess and said lower end surface.

3. A torque indicating screw comprising a head, an externally threaded shank extending from the head, said head having an access opening, said access opening including an internal wrench engageable surface, said head having an upper end surface and a lower end surface, said head having an annular recess extending from the upper end surface towards the lower end surface, the head material between the bottom of the recess and the lower end surface having a predetermined cross-sectional area to result in a predetermined stress yield point, a peripheral flange extending downwardly from the lower end surface of the head, and a stress-sensitive material in the recess in intimate contact with the surfaces defining the recess, said stress-sensitive material being reactive to relative movement of the adjacent portions of the head to indicate the occurrence of such relative movement, relative movement occurring when the torque applied to the screw reaches the stress yield point of the head material between the bottom of the recess and the lower end surface of the head.

References Cited by the Examiner

UNITED STATES PATENTS

| | | | |
|---|---|---|---|
| 857,295 | 6/1907 | Mudge | 85—45 |
| 2,353,531 | 7/1944 | Whitney | 85—45 |
| 2,550,010 | 4/1951 | Kovalar | 81—111 X |
| 2,724,964 | 11/1955 | Swingdale | 73—88 |
| 2,824,481 | 2/1958 | Johnson | 85—62 |
| 2,928,302 | 3/1960 | Owen et al. | 85—61 |

FOREIGN PATENTS 898,026    6/1962   Great Britain.

WILLIAM FELDMAN, *Primary Examiner.*

MILTON S. MEHR, M. HENSON WOOD, JR.,
*Examiners.*